US006016319A

United States Patent [19]
Kshirsagar et al.

[11] Patent Number: 6,016,319
[45] Date of Patent: Jan. 18, 2000

[54] COMMUNICATIONS SYSTEM FOR TRANSMISSION OF DATAGRAM PACKETS OVER CONNECTION-ORIENTED NETWORKS

[75] Inventors: Madhukar M. Kshirsagar, Morganville, N.J.; Thomas F. La Porta, Thornwood, N.Y.; David H. Shur, Middletown, N.J.; Malathi Veeraraghavan, Atlantic Highlands, N.J.; Clark Woodworth, Rumson, N.J.

[73] Assignee: Lucent Technologies, Inc., Murray Hill, N.J.

[21] Appl. No.: 08/714,704

[22] Filed: Sep. 11, 1996

Related U.S. Application Data

[60] Provisional application No. 60/007,105, Oct. 31, 1995.

[51] Int. Cl.[7] .............................. H04L 12/28; H04L 12/56
[52] U.S. Cl. ......................... 370/410; 370/474; 370/409; 370/399
[58] Field of Search .................................... 370/389, 390, 370/391, 392, 395, 396, 397, 398, 399, 400, 401, 409, 474, 410

[56] References Cited

U.S. PATENT DOCUMENTS

| 5,067,123 | 11/1991 | Hyodo et al. | 370/396 |
|---|---|---|---|
| 5,119,369 | 6/1992 | Tanabe et al. | 370/392 |
| 5,202,885 | 4/1993 | Schrodi et al. | 370/355 |
| 5,265,091 | 11/1993 | Van Landegem | 370/232 |
| 5,357,508 | 10/1994 | Le Baudec et al. | 370/397 |
| 5,432,777 | 7/1995 | Le Baudec et al. | 370/397 |
| 5,517,497 | 5/1996 | Le Boudec et al. | 370/399 |
| 5,519,707 | 5/1996 | Subramanian et al. | 370/399 |
| 5,521,917 | 5/1996 | Watanabe et al. | 370/399 |
| 5,583,862 | 12/1996 | Callon | 370/397 |
| 5,638,364 | 6/1997 | Sugita | 370/397 |

OTHER PUBLICATIONS

The ATM Forum, ATM User–Network Interface Specification, Ver. 3.0 (1993).
Comer, Douglas, Internetworking with TCP/IP, vol. I, (Prentice Hall, 2d ed.).
Chao, H.J., et al., "IP on ATM Local Area Networks," IEEE Communications, pp. 52–59 (Aug., 1994).
Veeraraghavan, M., et al., "An Alternative Approach to Call and Connection Control in Broadband ATM Networks," Proc. of the IEEE Broadband Switching Systems Workshop, Poland (1995).
Andreas X. Meler, et al., "Partial Connections Method for the Support of Ethernet Evaluation over ATM," in collected handouts from the 7th IEEE Workshop on Local and Metropolitan Area Networks (1995).
NBMA Next Hop Resolution Protocol (NHRP), IETF Routing Over Large Clouds Working Group Internet Draft (Aug. 26, 1994).
ATM Forum Private–Network Node Interface Phase 1.
ITU–T Broadband ISDN User Part (B–ISUP), Recommendations Q.2761, Q.2762, Q,2763, Q.2764.
ITU–T, "Draft Text for Q.2931" Nov.–Dec., 1993).

*Primary Examiner*—Ajit Patel
*Assistant Examiner*—Bob A. Phunkulh

[57] ABSTRACT

A communications system for transporting connectionless datagrams over a connection-oriented network is arranged to remove the address resolution function and the connection setup function from a sending host and combine them in a third-party connection server in conjunction with channel management at connection-oriented routing points. The third party request protocol can be used for Classical connectionless over a connection oriented network, legacy LAN emulation and Routing Over Large Clouds.

3 Claims, 9 Drawing Sheets

COMMUNICATIONS SYSTEM FOR TRANSMISSION OF DATAGRAM PACKETS OVER CONNECTION-ORIENTED NETWORKS

CROSS REFERENCE TO RELATED APPLICATION

This application claims the benefit of U.S. Provisional Application No. 60/007,105, filed on Oct. 31, 1995.

TECHNICAL FIELD

This invention relates to communications systems and more specifically to a method and a system for transmitting connectionless datagram packets using connection-oriented networks.

BACKGROUND OF THE INVENTION

The exponential rate of increase in the processing power of computers has fueled the demand for sophisticated software programs, including communications-oriented software programs, such as real-time collaborative workgroup applications. The challenge presented in finding the wherewithal to move the vast amount of data created by those applications has been met with the development and implementation of Asynchronous Transfer Mode (ATM) technology which is a connection oriented scheme. Unfortunately, implementation of ATM technology in end-points connected to ATM networks sometimes necessitates costly and significant, and sometimes wholesale, replacement of existing networking hardware and software in those end points where datagrams to be communicated are connectionless oriented. In an attempt to leverage users' considerable existing networking investment—especially in software—network designers have developed evolutionary solutions to transition today's private lines-based local area and wide area networks to full-blown ATM connectivity with global addressing of end points. Those solutions include the so-called "Classical Internet Protocol (IP) over ATM" method, the "Local Area Network Emulation" proposal and the "Routing Over a Large Cloud" method that are summarized by Chao et. al in the article "IP on ATM Local Area Networks", IEEE Communications Magazine, August 1994, pp. 52–59, hereby incorporated by reference as if fully set forth herein.

Referring to FIG. 1 prior art Classical IP over ATM involves three general steps. First, assuming no ATM connection between the source IP host 110 and a destination host, source host 110 sends an ATM Address Resolution Protocol ("ARP") request to IP-ATM-ARP server 120 on a pre-established connection with a well known Virtual Channel Identifier ("VCI"). Server 120 resolves the destination IP address to an ATM address and returns the ATM address to source host 110. Second, Q.2931-based signaling software 112 in source host 110 generates a SETUP message with the destination ATM address as a parameter, and an ATM connection is established through a series of ATM switches 130. The virtual path/virtual channel connection identifier ("VPI/VCI") to be used on the ATM interface from the sending node, is returned in a CONNECT message if it was not specified in the SETUP message. Finally, the IP address to VPI/VCI mapping is stored in cache 111 in source host 110. IP packets with the given destination ATM address are now routed on the VPI/VCI specified in the mapping table. As a result of this scheme, the ATM interface equipment serves as a subnet and a physical channel for communicating IP datagrams.

Upon receiving a Q.2931 signaling SETUP message, the destination host (or gateway/router) sets the specified VPI/VCI to deliver calls to the ATM Adaptation layer ("AAL"). Connections are released when the cache manager in a sending node times out on an IP-address to VPI/VCI mapping entry and decides to remove the entry by issuing a RELEASE message.

LAN emulation (LE) on ATM today works much like the "Classical IP" case except the ATM ARP server is replaced with an LE-ARP server. In general, the network protocol layer sends a network Protocol Data Unit (PDU) and next-hop address to The Medium Access Control ("MAC") encapsulation layer for the case of the Ethernet, where traditional ARP is performed to obtain the MAC address. The network PDU is encapsulated into a MAC frame and then passed to the ATM layer. The source host extracts the MAC address from the frame and uses the LE-ARP server to map it to an ATM address. Signaling software on the host then sets up a connection using the ATM address. The VCI obtained from this connection is then cached in an ATM address-to-VCI cache for future use. The frame is then segmented into one or more ATM cells and sent on this VCI. After a period of inactivity on the VCI, the connection times out and is released.

The third prior art scheme is Routing Over a Large Cloud ("ROLC"). A collection of end-points, routers or hosts, connected over a fabric such that direct communication can be established between any pair of end-points subject to policy restrictions employed within the fabric is generally referred to as a "Large Cloud." An ATM fabric might typically consist of a set of private and public ATM networks, interconnected via User Network Interfaces (UNI) or Private Network to Network Interfaces (PNNI). While the Classical IP model, when IP networks are overlaid over an ATM-based large cloud, requires end-points that do not share the same network prefix to communicate via an intermediate router, ROLC enables end-point communication directly at the ATM level (e.g. via an ATM Switched Virtual Connection ("SVC")) even when end-points do not share the same network prefix. There are several techniques for routing over large clouds. One technique is based on the Next Hop Resolution Protocol ("NHRP"). NHRP is used to return a binding between a destination connectionless address and the corresponding ATM address to a requesting source connectionless host. Current work in the Internet Engineering Task Force (IETF) is considering two modes of NHRP server operation: server mode, where one server may cover several subnets; and fabric mode, where there is an NHRP server associated with each router. In the first case, the servers have their own tables for forwarding NHRP requests and would be used in early deployment of NHRP while in the latter case, the same tables that are used to find the next hop address at the routers are used to forward the NHRP requests.

All of these techniques, Classical IP, LE-ARP and ROLC propose a two-step method of a) mapping a connectionless destination address such as an IP address to a connection-oriented destination address, such as an ATM address, and b) setting up and establishing a connection over a network to permit exchange of data between a source node and a destination node. As used herein a node includes an end host, router or bridge. In all three solutions, IP addresses are mapped to ATM addresses using a form of ARP. Connections are most commonly established with signaling protocol such as ITU-T (Q.2931), found in ITU-T, "Draft Text of Q.2931," November–December 1993, hereby incorporated by reference as if fully set forth herein, and the ATM Forum, found in the ATM Forum, ATM User-Network Interface Specification, Version 3.1 (Jul. 21, 1994).

Of particular significance is the fact that these solutions require the source and destination hosts to be loaded with signaling software to obtain datagram-to-ATM address resolution services from the network, and perform signaling message generation and processing functions for establishing a connection, including tracking all the VCIs assigned to all associated connections. These solutions expend a significant amount of network resources devoted to the processing of the considerable number of signaling messages generated for address resolution and connection request functions and delay the call setup procedure associated with these procedures.

SUMMARY OF THE INVENTION

Accordingly the present invention is directed to a communications system that combines the address resolution function and the connection setup function in a third-party connection control and which operates in conjunction with channel management at connection-oriented routing points to enable quick connection setup procedures and reduce or eliminate the need for endpoint signaling software for communicating connectionless datagrams over connection-oriented networks.

In one embodiment of the invention, a source host that has a datagram to transmit to a destination host checks its internal storage devices to determine whether a connection is already established between it and that destination host. In the absence of such a connection, the source host sends a request containing the destination host connectionless address to a connection request server located at a well known VCI. The connection request server is arranged to perform the address resolution functions as well as the connection setup functions in a single round trip communication between transmitting host and server, in contrast to the two round trips required by the prior art. Specifically, the server maps the datagram or connectionless packet address into an ATM address and then uses this address to establish a connection to the destination host. Thereafter, the connection request server returns a VCI to the transmitting host that identifies the connection for exchange of subsequent data packets.

DETAILED DESCRIPTION OF THE INVENTION

Figure 1:
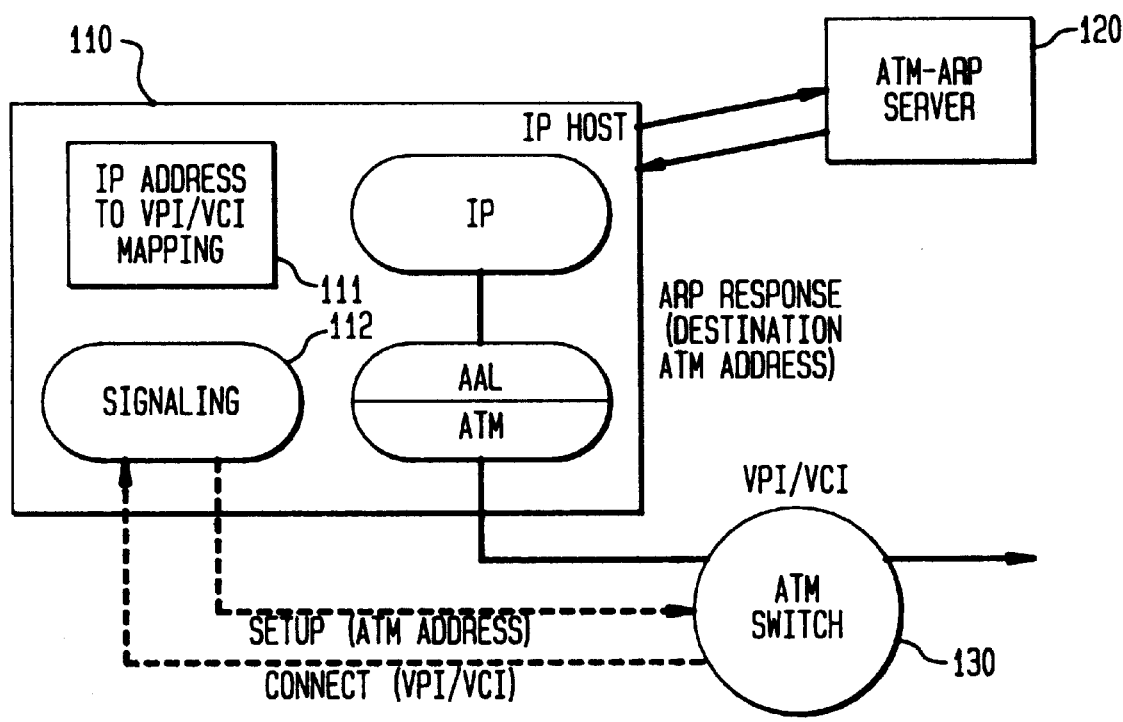
FIG. 1 is a diagram showing prior art Classical IP over ATM.
Figure 2:
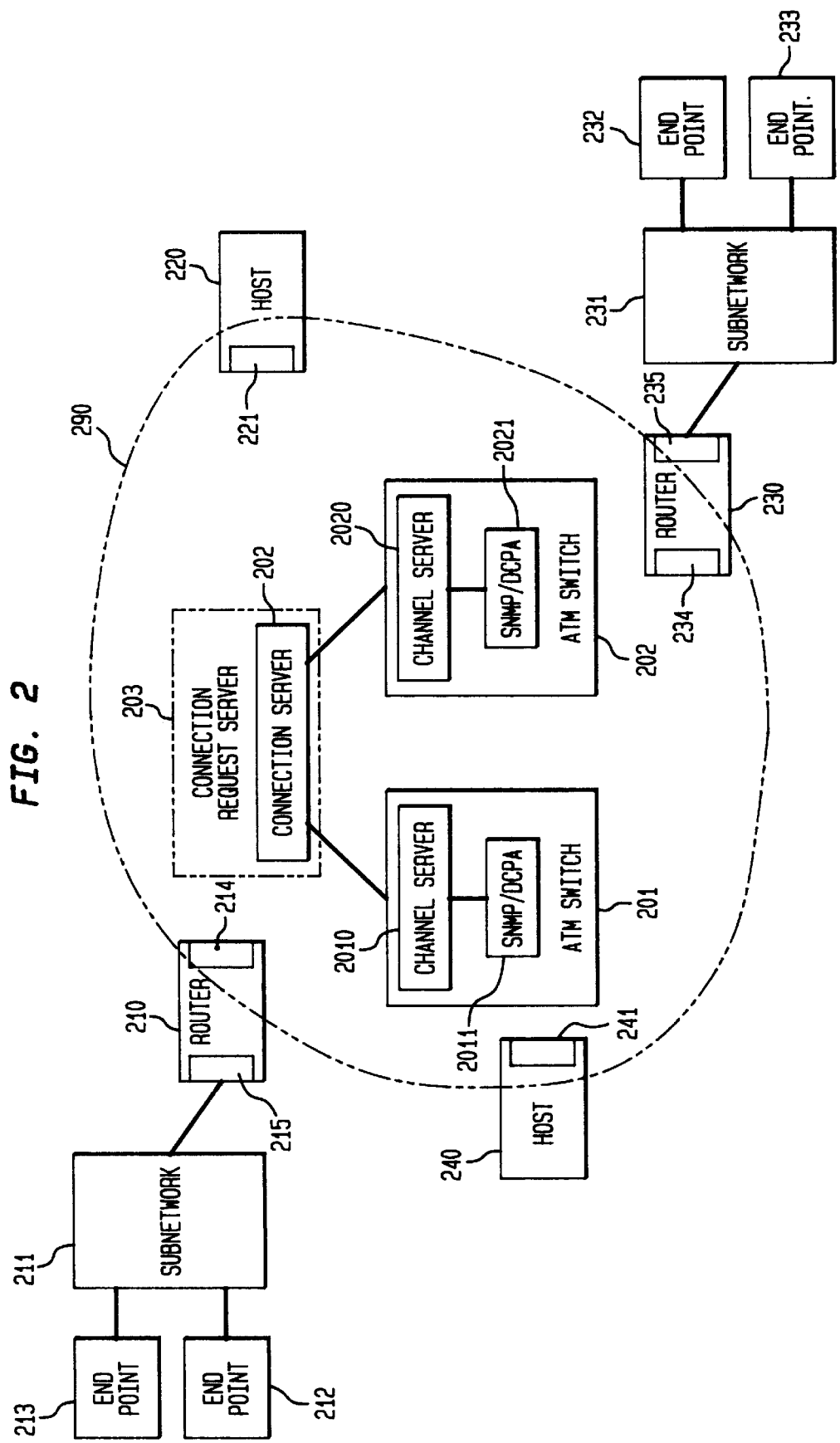
FIG. 2 illustrates a network for Classical transmission of connectionless packets over a connection-oriented network in accordance with the present invention.

Referring to FIG. 2, an illustrative communications network is shown in block diagram format designed to implement the principles of the invention as applied to the Classical transmission of datagram packets over connection-oriented communications networks. As shown, end-points 212, 213 and 232, 233 are connected to subnetworks 211 and 231, respectively. End-points 212 and 213 (232 and 233) may be, for example, processors that communicate between themselves using subnetwork 211 (231) and a connectionless protocol such as the well-known Internet Protocol (IP). Datagram packets from end-points 212 and 213 (232 and 233) that require access to network 290 are routed to router 210 (230). Those datagram packets may be destined for host 220 or 240, or alternatively to an end-point that is known to router 230 (210). Routers 210 and 230 are arranged to support the aforementioned connectionless protocol (IP) and a connection-oriented protocol, such as ATM. The terms IP and ATM as used herein are intended to indicate connectionless and connection-oriented protocols, respectively, and are not intended to be limiting in any other way. Hosts 220 and 240 are connected to connection-oriented network 290 via connection-oriented (e.g., ATM) interface cards 221 and 241, respectively. Similarly, routers 210 and 230 are connected to connection-oriented network 290 via connection-oriented interface cards 214 and 234, respectively. Interface cards 215 and 235 support a connectionless stack of protocols, such as the Internet Protocol (IP). For signaling communications, such as connections requests with network 290, routers 210 and 230 use the connection request protocol ("CRP") server 203 to perform the address resolution function for communications network 290 and through blocks 2010/2020 and 2011/2021 representing software instructions, implement third party connection setup.

Figure 3:
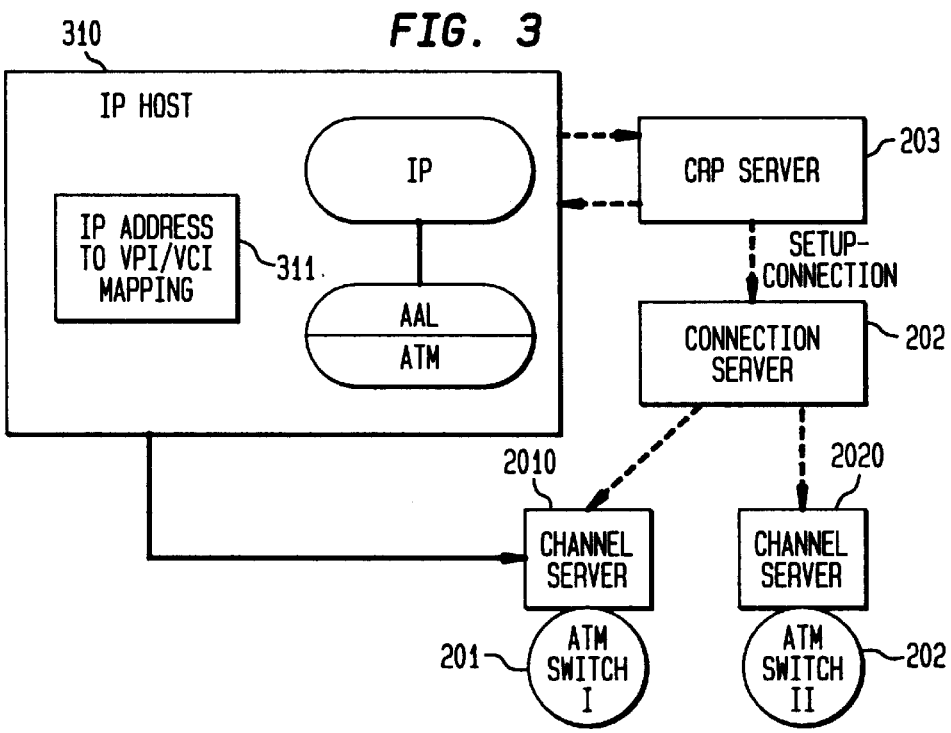
FIG. 3 is a block diagram illustrating Classical IP over ATM using a connection request protocol server in accordance with the present invention.

Referring to FIG. 3, upon receiving a connection request query from source host 310, server 203 resolves a connectionless address, requests the establishment of a connection, and returns a VPI/VCI. Specifically, when source host 310 wants to transmit a packet to a destination host, it checks for the destination host's connectionless address in the VPI/VCI mapping table stored in cache 311. If this table does not have an entry for the destination host source host 310 generates a request query to CRP server 203, located on a preestablished VCI, in other words its location is well known. CRP server 203 first determines the ATM address corresponding to the destination host and then requests a connection using a third-party connection setup request. Since the current signaling standards such as Q.2931 and the ATM Forum (ATMF) do not support this feature of third-party connection control, two exemplary schemes may be used to implement third-party connection control, namely the Distributed Call Processing Approach (DCPA) that is disclosed in U.S. Pat. No. 5,434,852, hereby incorporated by reference as if fully set forth herein, and Standard Management Information Base SMIB of the Simple Network Management Protocol (SNMP) as described in "Definitions of Managed Objects for ATM Management version 8.0 using SMIv2 (M. Ahmed and K. Tesink eds. 1994), hereby incorporated by reference as of fully set forth herein. A brief description of DCPA connection setup and SNMP MIB connection setup is provided below.

In a DCPA third-party connection setup environment, the functionality needed to setup/release a connection is split between two types of servers, connection servers and channel servers. The role of a connection server is to determine an end-to-end route, possibly with the help of other connection servers, and to maintain the machine state of each connection, defined as the user information path extending between AAL termination points. The role of a channel server is to maintain the state of channels, defined as a point-to-point link on an ATM interface and to manage the VPI/VCI space and bandwidth on ATM switch interfaces. One channel server is associated with each ATM switch. The interface protocol to the connection server is designed so that it can accept third-party connection requests. Upon receiving a connection setup request, first or third-party, it determines the set of switches through which the connection must be routed based on the current loading conditions of the network. An end-to-end route may span the domains of multiple connection servers, in which case a connection server establishes only its segment of the connection before sending a setup-segment request to the next connection server en-route to the destination host. Having determined how to route its segment of the connection, the connection server communicates with channel servers on the ATM switches in the route requesting these servers to reserve-resources for the connection. These servers perform connection admission control algorithms in parallel, in contrast to the prior art standards where hop-by-hop processing is done at the switches. If the requested resources are available, the channel servers respond back to the connection server with the selected VCIs for each link in the segment of the connection. The connection server may then compute any end-to-end Quality-of-Service ("QoS") measures, such as delay. If the requested values for these measures can be met on this segment of the connection, the connection server passes the VCIs previously returned and the QoS parameters to the channel servers. These servers make entries in the VPI/VCI translation tables in order to configure the switch fabric for this connection, and also set parameters for run-time algorithms such as rate control, usage parameter control, etc., if needed. This last set of operations is also executed in parallel at all the channel servers associated with the ATM switches on the segment. Segment setup from connection server to connection server proceeds in a hop-by-hop manner.

Three features of the communications system of the present invention make it attractive to support connectionless packets over connection-oriented networks. First, third-party connection setup allows CRP server 203 to request connections on behalf of a source host, removing this task from the source host. Second, the channel server at the access switch can be instructed by the connection server to manage the VPI/VCI and bandwidth in both directions on the interface between itself and the host. This as well removes channel management and associated signaling software from the hosts. Third, since the channel servers on all the ATM switches in the route perform their functions in parallel, fast connection setup is possible. Fast connection setup is important because connectionless applications are built with the assumption that the underlying network is connectionless, which poses tight performance constraints on connection setup times. With a CRP server and DCPA signaling, the two phase address resolution and connection setup procedure needed for the Classical IP connectionless over connection-oriented model is reduced to a single phase. This eliminates one round trip delay for communication between the host and the network as required with prior art systems.

In an SNMP MIB environment, the connection server and channel servers are software modules that can be located in any general-purpose host. The connection server software determines the route of the connection from the source host to the destination host. The channel server software module performs connection admission control ("CAC"), and selects VPI/VCIs to support the connection. It also communicates with off-the-shelf connection-oriented switches to read and write MIB variables using the get and set operations of SNMP. For example, to configure the switch fabric for a connection, the channel server can set the cross-connection object in the switch SNMP MIB. In FORE ATM switches, this MIB variable is called Channel Route Entry. The channel server can periodically poll the switch to obtain current loading conditions or read MIB variables needed for the CAC algorithms. The assumption made here is that the SNMP MIB reflects the current loading conditions based on all the SVCs and Permanent Via Circuits ("PVCs") passing through it. SVCs may be setup through Q.2931 signaling software, while PVCs may be set by some other manager in the network communicating directly with the SNMP MIB. Unless the SNMP MIB reflects the current usage conditions based on all the SVCs and PVCs, the channel server may admit a connection to support connectionless traffic when switch or link resources are unavailable. Similarly, the VPI/VCI space on ATM interfaces must be subdived among the PVC manager, SVC signaling software and the channel server shown in FIG. 2.

At the destination host, the choice of VCI for a particular communication can be hardwired based or software based. In the hardwired approach, the destination host registers a range of VPI/VCIs with CRP server 203 on which it can receive packets. When a connection is established, the ATM switches will select a VPI/VCI value from this set and use it for the user information path. For hosts that directly connect to a switch port, such as host 240 or host 220, the entire VPI/VCI range could be made active. The hardwired approach may be a good default approach since all packets are generally passed to higher protocol layers that reject unwanted connections and since this appears suitable for LAN emulation as well and discussed further below.

With the software approach CRP server 203 sends a message to the destination host with the VPI/VCIs for incoming connections. Signaling software in the destination host is required with the destination host which accepts/rejects the incoming connection and loads the IP address to the VCI mapping table 311. It also implies that CRP server 203 should notify the destination host when a connection is removed so that the receive table can be cleared. This explicit approach provides some indication of when incoming data can be expected, a feature useful for some protocols. In addition, it can be used to support bandwidth reservation if needed.

Communication with the CRP server 203 can be implemented in the source and destination hosts using a user-level daemon process that uses a higher layer protocol, such as Transmission Control Protocol ("TCP") or User Datagram Protocol ("UDP") or as a device driver with specially formatted cells similar to ARP. With the higher layer protocol approach a simple daemon process could manage the cache through I/O control calls to the ATM/AAL subnet connectionless device driver based on the connection information exchanged with the server. When CRP based notification is used on the receive side, incoming connection requests would be answered (or rejected) by this daemon process which would update tables in the receiving host. When specially formatted ATM cells are used for communication with CRP server 203, the daemon functionality is included in driver code subroutines. However, the daemon process may prove more useful than the specially formatted ATM cells for supporting special services such as multicast.

Another aspect of the implementation is the method by which the CRP server 203 acquires the connectionless (e.g., IP) address to ATM address mappings for all hosts in its domain. We assume that in the registration procedure used by the hosts, entries are created in this mapping table. If the number of hosts within the domain of a CRP server 203 becomes large, it may be required to have multiple CRP servers per network. This scalability issue is discussed in a later section.

The CRP server concept can easily be generalized from Classical IP over ATM to other internetworking/interworking models such as LAN Emulation (LE or LANE) and ROLC, by the addition of a "protocol-type" field in the CRP message. The protocol type field will be set, for example, to be connectionless for Classical IP, ROLC, or LANE, etc., and allows new protocols to be incorporated as the need arises. An LE node will direct an LE-CRP request with a protocol-type field set to "LANE" to the CRP server, requesting resolution of a target MAC address as for example with the Ethernet to a VCI and obtain connection setup services in the process. Thus, an LE end point can obtain connection oriented SVC services without having to support connection-oriented signaling protocols.

Figure 4:
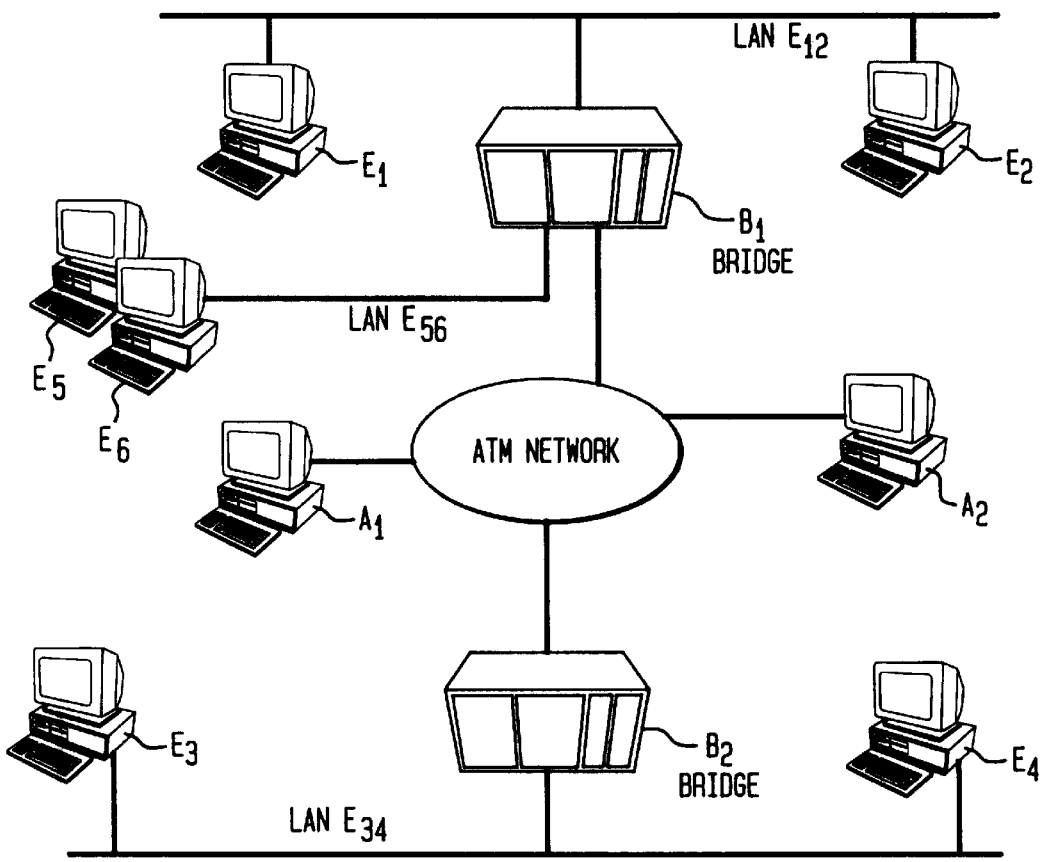
FIG. 4 depicts an exemplary configuration of legacy LANs, bridges, and a connection-oriented LAN.

LAN Emulation allows the interconnection of existing legacy LANs at the link protocol layer thereby allowing transparent connection of all higher-level networking layers (IP, IPX, Appletalk, etc.). This interconnection is called bridging. Referring to FIG. 4 an exemplary configuration of legacy LANS, bridges, and a connection-oriented LAN is shown, where $A_i$ designates the ith connection-oriented host, $B_i$ designates the ith bridge, and $E_i$ designates the ith host on a legacy LAN such as Ethernet. It should be understood that although $E_i$ refers herein to an Ethernet host, the subject invention is applicable to other shared media LANs including 802.xLANs such as FDDI or token ring. In FIG. 4, Ethernet hosts $E_1$ and $E_2$ reside on one side of bridge $B_1$ which connects to an ATM network with hosts $A_1$ and $A_2$ as well as to a second LAN with hosts $E_5$ and $E_6$. The ATM network also connects directly to bridge $B_2$ which is also connected to a third LAN with hosts $E_3$ and $E_4$.

| Case | Sending Host | Receiving Host |
|---|---|---|
| 1. | $A_1$ | $A_2$ |
| 2. | $A_1$ | $E_1$ |
| 3. | $E_1$ | $A_1$ |
| 4. | $E_1$ | $E_3$ |
| 5. | $E_1$ | $E_2$ |
| 6. | $E_1$ | $E_5$ |

Figure 5:
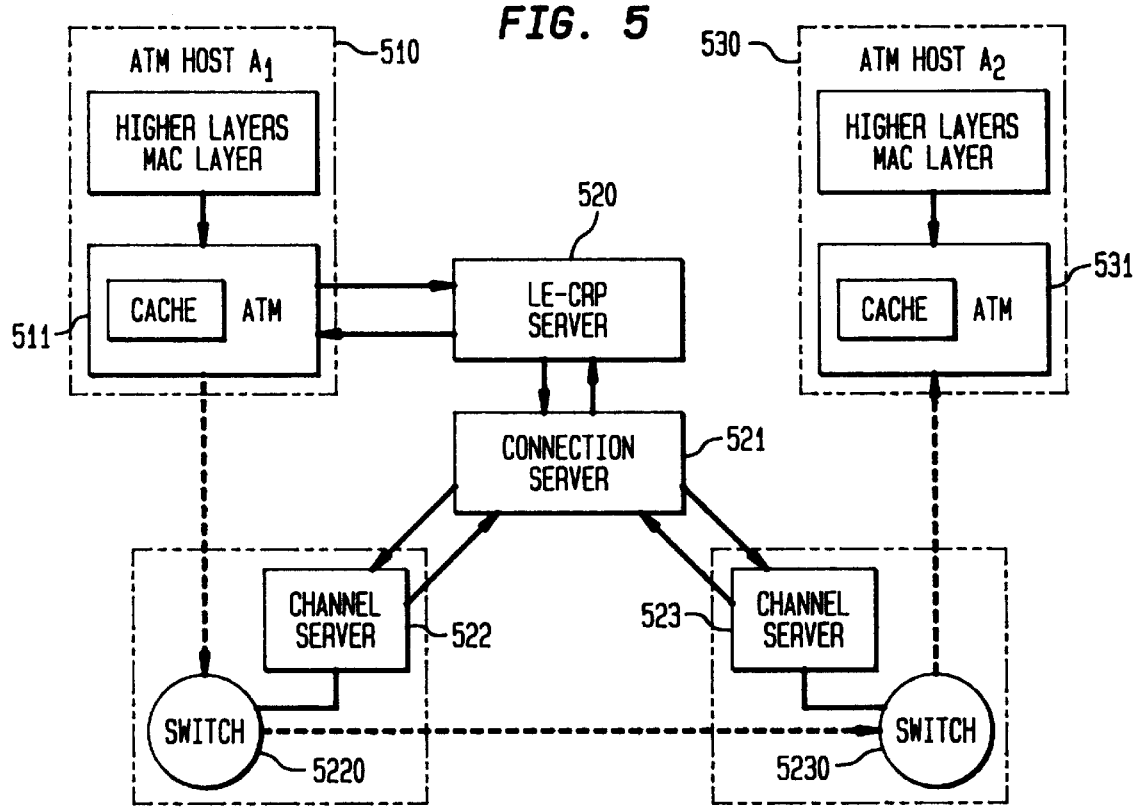
FIG. 5 illustrates the flow of communication in LAN emulation (LANE) cases for transmitting datagram packets over connection-oriented communications networks in a Local Area Network (LAN) emulation environment in accordance with the principles of the invention.

Table 1 shows various LE end-to-end transport scenarios. It is assumed that the MAC address is known from the MAC interface-layer where it might be obtained from a table or from traditional ARP procedures. Referring to FIG. 5, the flow of communication for LE-CRP in accordance with the present invention is shown. The signaling messages flow between LE-CRP server 520 and connection server 521 without involving the host as with LE-ARP in the prior art. This scheme is advantageous when there are no native ATM applications on the host because no signaling functions are required in the host, yet many of the ATM advantages (e.g. bandwidth) are retained. An ATM interface and a dynamically loading LE-CRP device driver would permit easy installation. The LE-CRP server 520 provides the MAC-to-ATM address translation and requests the setup of a connection, and returns a VCI to the source host, rather than an ATM address. The cost to the host is the need for an additional message to LE-CRP server 520 to drop the connection when it times out from inactivity. The figure also shows the parallel execution of the DCPA connection setup that provides rapid connection establishment which is important for good performance when connectionless service is layered over a connection oriented network.

The flow of communication in accordance with the present invention, where LAN Emulation is between two connection-oriented hosts is as follows. The network layer sends a network Protocol Data Unit (PDU) and next-hop address to the MAC encapsulation layer where traditional ARP is performed to obtain the MAC address and the network PDU is encapsulated into a MAC PDU. The MAC protocol layer passes this MAC packet and MAC address to the ATM protocol layer. This frame is converted to ATM cells using an adaptation layer that performs segmentation by the source host 510 (530) and reassembly by the destination host 530 (510). This layer also maintains a cache 511 (531) of MAC address to VCI mappings. If the MAC address of the frame matches one of the entries in cache 511 (531), a connection to the destination host already exists, and the ATM layer uses the VCI from cache 511 (531) to send the MAC frame to its destination. Cache 511 (531) may contain other information including expiration times, ATM addresses, or other references.

If the MAC address is not in cache 511 (531), a connection does not exist for the destination host. The ATM driver then formats an LE-CRP request containing the MAC address of the destination, in addition to the MAC address of the LE-CRP server. LE-CRP server 520 looks up the MAC address of the destination host in its table to find the ATM address of the destination if it was not handed the ATM address directly. It then signals connection server 521 on behalf of the source host 530 (510) requesting a third party connection between the source host 510 (530) and the destination host 530 (510). The connection server establishes a connection by communicating with channel servers 522 and 523 at each switch 5220 and 5230 along the route. Note that the local switch associated with the destination host normally accepts connections on behalf of destination host 530 (510). Although variations of the LE-CRP protocol provide for host notification, normally the destination has a VCI or a range of VCIs available for incoming connections which have been made available to the channel server upon initial registration. The channel server associated with the switch connected to destination host 530 (510) manages destination host's 530 (510) VCI space.

If the connection establishment is successful, connection server 521 notifies LE-CRP server 520 which then notifies source host 510 and returns the assigned VCI for the connection. Source host 510 (530) can now send its MAC frame to destination host 530 (510). Notice that on time-out, destination host 530 (510) does not need to be notified. All frames received by destination host 530 (510) are passed to the MAC layer independent of which connection or VCI the frame was received on. Thus, the channel server of the ATM switch connected to destination host 530 (510) can instantly reuse VCIs that were closed. Note that the reassembly layer does need to distinguish between VCIs to correctly assemble frames.

The prior art connection setup between an ATM host and an Ethernet host on opposite sides of a bridge is nearly identical to the conventional approach between ATM hosts. The LE-ARP request will cause server an ARP server to respond with the ATM address of the bridge. A smart host will maintain a cache of ATM-to-VCI pairs that are already established. At this point, such a host will check to see if a connection to that ATM address already exists because of a prior request for some other MAC address on the other side of the bridge. The cache prevents duplicate connections when different MAC addresses are associated with the same bridge. The MAC frame will be sent using the existing VCI associated with the connection, if it exists; otherwise, a new connection will be established. As discussed previously, the VCI passed to the hosts and the frame will be sent to the bridge.

The bridge will normally maintain a cache of MAC addresses for each legacy LAN port. When the bridge receives a MAC frame from an ATM interface, it will check all caches to determine which port to send the frame on. If the MAC address is found, it transmits it on that port to host otherwise it transmits it on all the legacy LAN ports but not the ATM port. This corresponds to the case where the bridge has purged the local MAC information for this host from its caches.

Figure 6:
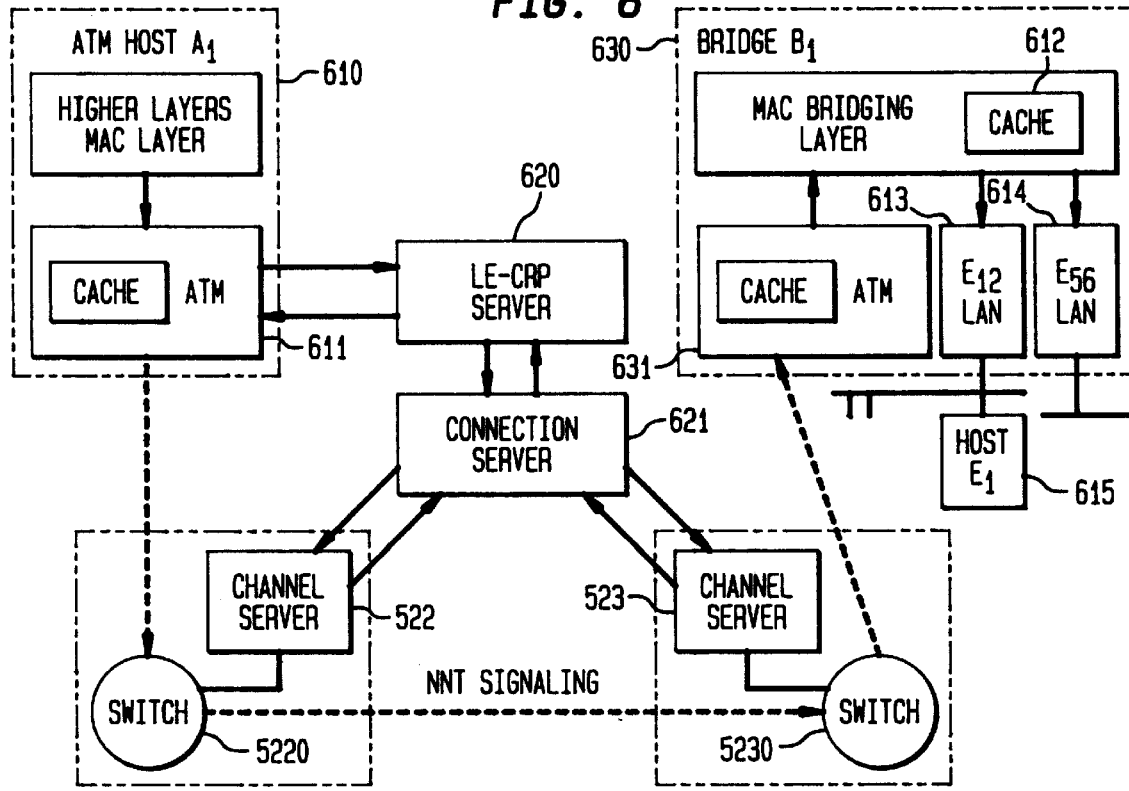
FIG. 6 also LANE, illustrates the flow of communications between a connection-oriented host and a connectionless host on opposite sides of a bridge.

Referring to FIG. 6, communication between a connection oriented host and a connectionless host on opposite sides of a bridge in accordance with the present invention is shown where LE-CRP server 620 returns the VCI of the connection to bridge 630 associated with the requested MAC address. LE-CRP server 620 maintains tables of existing connections from hosts to bridges and can detect the case where two different MAC addresses are associated with the same bridge. When a connection to the same bridge already exists, server 620 will return the VCI of the existing connection. For LE-CRP server 620 to detect this situation, the LE-CRP requests from source host 610 must include its own MAC address or ATM address in the request to LE-CRP server 620. This would be required anyway for LE-CRP so that it can translate the MAC address to an ATM address for the third party call setup. We assume that the hosts and bridges register their MAC addresses with LE-CRP server 620 on initialization and provide a range of VCIs to LE-CRP server 620 for incoming connections.

Multiple ATM ports could be attached to bridge 630 to support multiple non-interconnected ATM networks or to provide higher bandwidth than available in a single port. However, this is more complicated and requires additional coordination to determine if the frame should be transmitted on one of the ATM ports. Generally, the ATM networks would be interconnected so it is not clear that multiple attaching ATM interfaces to bridge 630 would be a common situation. In the case where there are multiple bridge ports to a single ATM network, the ATM addresses of each ATM interface for the requesting bridge or host should be sent in its LE-CRP requests. This allows LE-CRP server 620 to correctly identify local hosts. Assuming a single LE-CRP server with separate instantiations of state for each port, the LE-CRP server will need to coordinate its responses to prevent duplication of connections.

Frames from the MAC layer are checked against cache 611. If the MAC address is not found in the cache, a LE-CRP request is sent to LE-CRP server 620 which maps the MAC address to an ATM address and checks a table of connections for this host to see if it already has a connection to this destination. If it does, it returns the VCI of the existing connection. If not, LE-CRP server 620 sends a message to connection server 621 to arrange for a connection to be established between the ATM host 610 and the ATM interface on bridge 630. Connections are always accepted by the network for bridge 630. LE-CRP server 620 responds with the VCI of the new connection and the frame is transmitted to bridge 630 which routes the frame to the appropriate shared media interface or to all shared media interfaces 613 and 614 if the destination MAC address is not in cache 612 for one if its interfaces.

In one advantageous embodiment, LE-CRP server 620 can send a list of the MAC addresses behind bridge 630 to source host 610. Source host 610 can then populate its cache 611 and directly forward cells to those hosts without invoking LE-CRP server 620. It is also possible to have multiple LE-CRP servers, but detecting duplicate connections is more difficult as discussed below.

Figure 7:
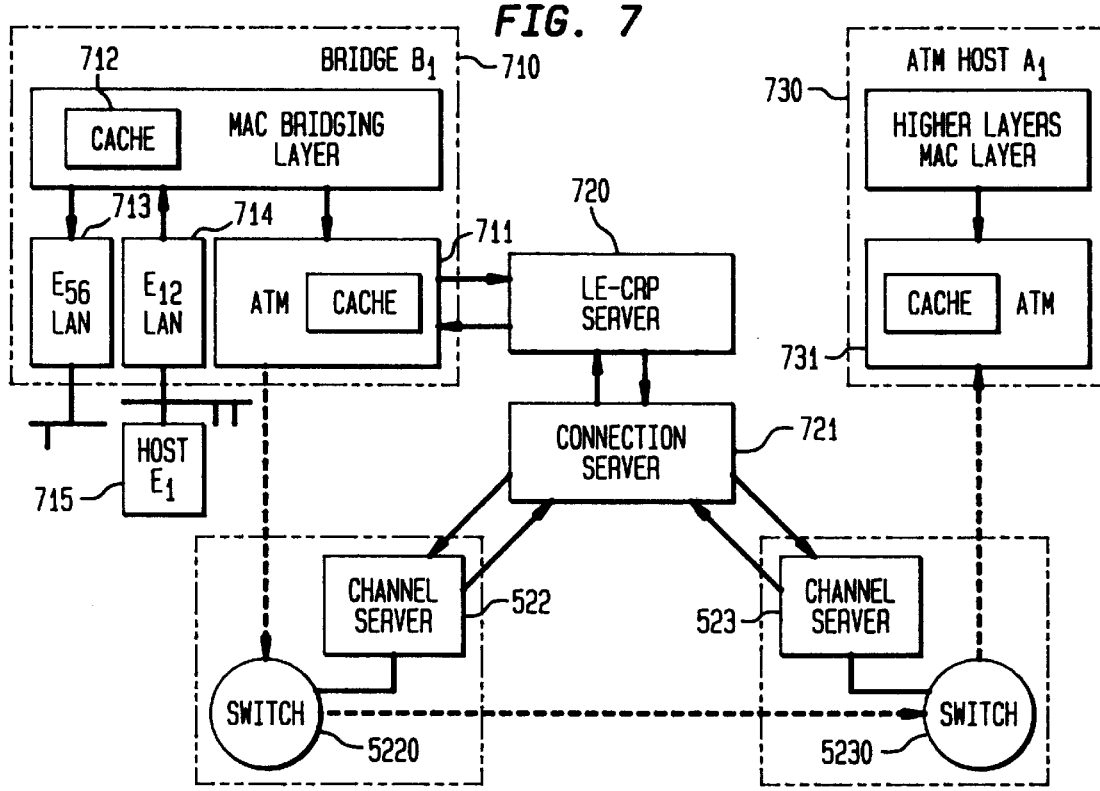
FIG. 7 also LANE, illustrates the flow of communications between a shared media host and a connection-oriented host in accordance with the present invention.

Referring to FIG. 7, the flow of communicating a datagram from a shared-media host 715 to an ATM destination host 730 (A1), with LE-CRP server 720 in accordance with the present invention is shown. Shared media host 715 sends a frame with destination host's 730 MAC address. Bridge 710 (B1) sends an LE-CRP request to LE-CRP server 720. LE-CRP server 720 maps the destination host's 730 MAC address to the destination host's 730 ATM address and establishes a connection between bridge 710 and the destination host 730. The LE-CRP server 720 does not need to check for prior connections to the host or save state information since the ATM connections are already cached in bridge 710. LE-CRP server 720 then returns the VCI of the new connection to bridge 710, which puts it into its ATM cache 711. The frame can then be transmitted to the destination host 730. If LE-CRP server 720 finds that the destination ATM address matches the source bridge's ATM address it does not establish the connection, the ATM address is returned but no VCI is returned. This corresponds to the case where the host is located behind the same bridge. In this case, bridge 710 will then flood the local shared media interfaces.

Figure 8:
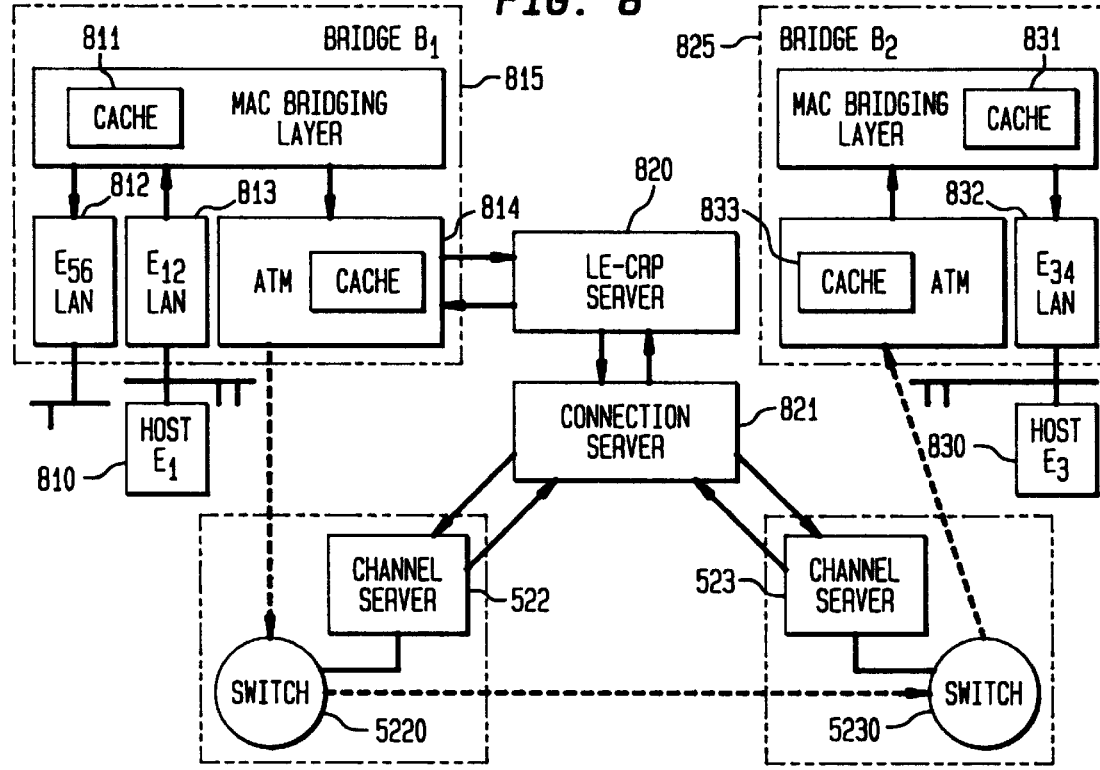
FIG. 8 also LANE, illustrates LAN legacy communication between two connectionless hosts over a connection-oriented network.

Referring to FIG. 8, communication of a connectionless datagram between two Ethernet hosts, over a connection oriented network is shown employing an LE-CRP in accordance with the present invention. The source Ethernet host 810 sends a frame with the destination host's 830 MAC address into the network, and it is received by bridge 815. Bridge 815 checks to see if this address is in cache 814. If not, it makes an LE-CRP request with the destination host's 830 MAC address and LE-CRP server 820 establishes a connection to bridge 825 and returns the VCI of the connection and the ATM address of bridge 825 to bridge 815. LE-CRP server 820 can detect when the requested MAC address maps to an ATM address that was previously established for a different MAC address and returns the VCI and ATM address for that connection instead of establishing a new connection. If bridge 815's own ATM address is returned, the frame is sent to all of the local shared-media interfaces instead of being sent to the ATM interface because that MAC address is on a local bridge shared-media interface.

Figure 9:
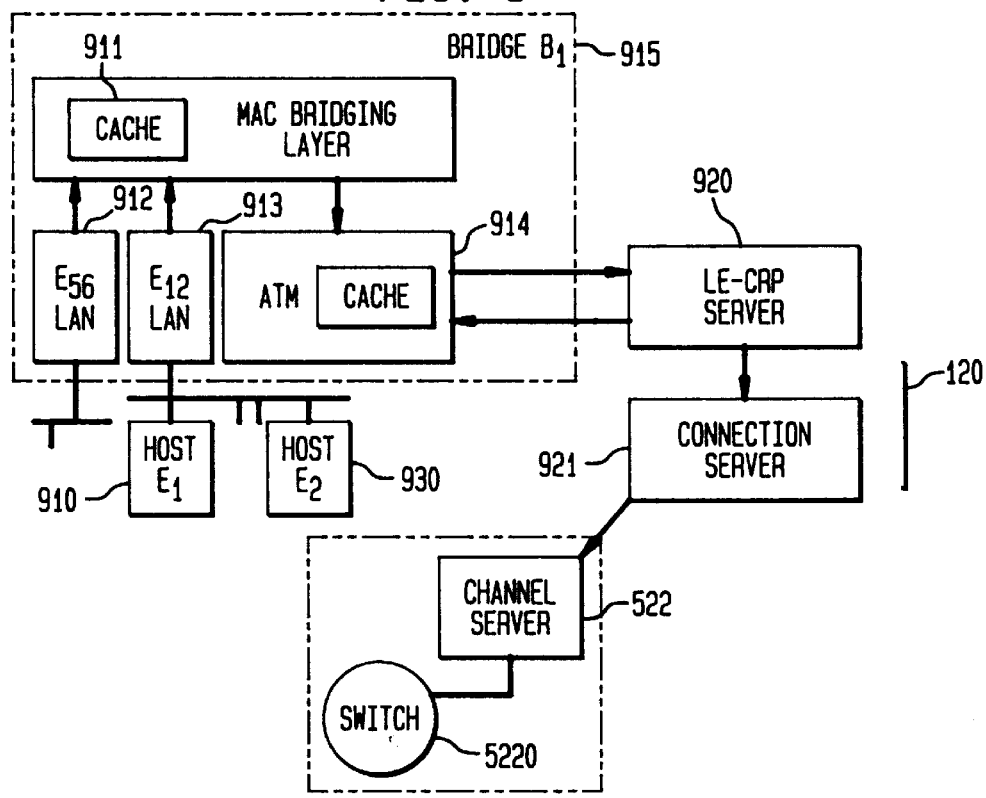
FIG. 9 also LANE, illustrates communication between two connectionless hosts on the same local network.

Referring to FIG. 9 the flow associated with a frame from a shared media interface to the same shared media interface is shown. Source host 910 puts a connectionless packet on the shared media interface where it is received by destination host 930 and bridge 915. Bridge 915 checks its local cache 911 for the MAC address for network interface 913. If the MAC address is found, bridge 915 will do nothing further since it knows that E2 has already received the frame. If not, it sends an LE-CRP request to server 920 which returns the ATM address of bridge 915 and does not establish a connection. Bridge 915 knows that destination host 930 must be on one of its shared-media interfaces and bridge 915 then sends the frame to each of its shared-media interfaces except network 913. At some later time, bridge 915 will learn E2's location for its cache 911.

Figure 10:
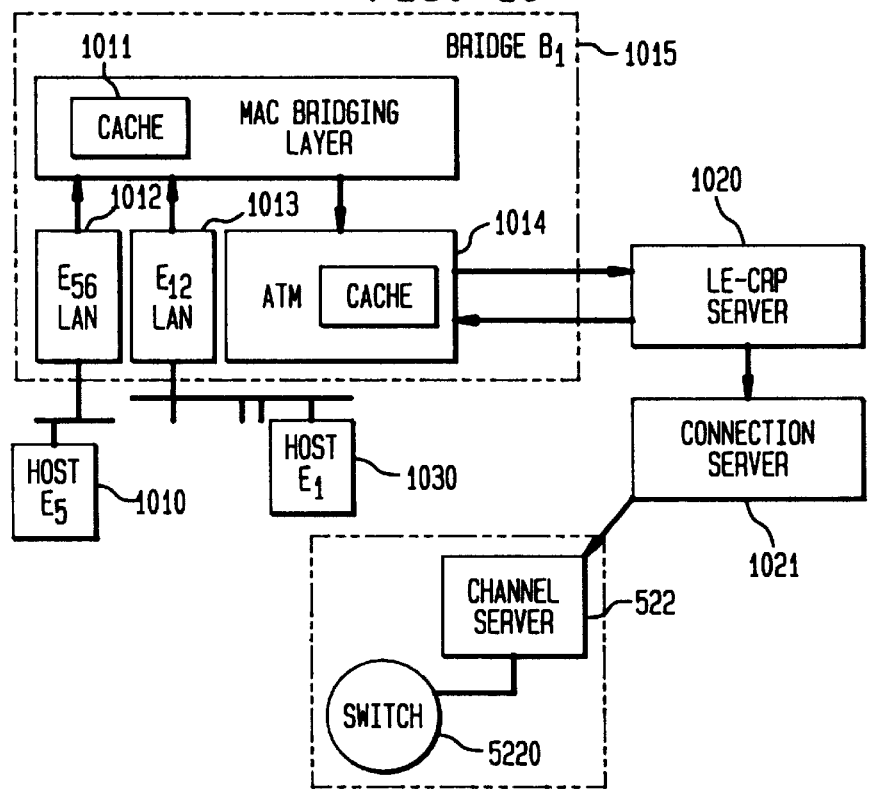
FIG. 10 also LANE illustrates communication between two connectionless hosts on different networks on the same bridge.

In FIG. 10, hosts 1010 and 1030 are located on different networks and attached to bridge 1015 through interfaces 1012 and 1013, respectively with no intermediate ATM network. Consequently, when source host 1010 sends a frame, destination host 1030 cannot hear it. Bridge 1015 checks its local cache 1011 for destination host's 1030 MAC address. If it finds it, it forwards the frame to the corresponding interface 1013. If the MAC address is not in cache 1011, it sends an LE-CRP request to the LE-CRP server 1020 which returns the same ATM address as bridge 1015 and does not establish a connection. Bridge 1015 then forwards that frame to all the interfaces except for 1012. At some later time, bridge 1015 will learn destination host's 1030 location for its cache.

When a host or bridge detects no activity for a period of time on a connection associated with a particular VCI, it sends a time-out message to the LE-CRP server notifying it that it is purging the entry and the network should free the resources associated with the connection. Doing time-outs on a VCI basis rather than a MAC basis simplifies the case where mulptile MAC addresses are associated with a single VCI for connections to bridges, because separate tracking of the status of each MAC link is not required.

Until this point, point-to-point unidirectional connections were assumed, in other words no broadcast or multicast communications. It was also assumed that the source hosts knows the MAC address of the destination host. A higher-layer ARP function (not LE-ARP) is often used in the prior art to map the network-level address to the MAC-level address and these layers often rely on broadcast capabilities in the underlying subnet to find an ARP server. This situation is further complicated in connection oriented networks because of the connection setup that is needed to reply to the request. By way of example, connectionlesss network address is supplied by the application and an ARP request must be generated to an ARP server to obtain the MAC-level address, which could be an FDDI or Ethernet MAC address, for example.

Although ARP is not directly part of the LAN emulation layers, it cannot be ignored because its services are required by the higher-level layers and most ARP protocols make assumptions that the network is a shared media broadcast network and that it is connectionless. Therefore, ARP requires non-trivial support at the LAN emulation level. To illustrate, suppose a source Ethernet host E1 wants to send a packet to a destination Ethernet host E2, if the MAC address is not already cached in the connectionless to Ethernet table in the MAC layer of E1, that layer broadcasts an ARP request asking for the MAC address for E2's connectionless address. Host E2, hearing the broadcast request, returns an ARP response with its MAC address to E1 using E1's MAC address from the ARP request, and E2 saves a copy of E1's MAC address in its table for future use. Broadcast requests are rebroadcast on each of the shared media interfaces and the response is returned like any other frame. Although ARP assumes a broadcast media for delivering the request, a host on the network can act as an ARP server for all the hosts on the network and that host will respond to all ARP requests for the individual hosts. For a network without broadcast, this requires each host to establish the address of the ARP server in advance. The host servicing the ARP request generally assumes that it can use the source addresses in the request packet as the destination address and insert the datagram message back on the network to return it to the source. In connection oriented networks, a connection must first be established before the response can be sent back to the requester.

To support ARP over an ATM network, an initial ARP request will cause an LE-CRP request for the MAC multicast address. The LE-CRP server will establish a multicast connection and will respond with the VCI of the connection to the ATM source host. The source host transmits the ARP request on the multicast connection. The destination host A2 sees its MAC address and responds causing an LE-CRP request to be generated to the LE-CRP server. The server establishes a connection to source host A1 from destination host A2 and responds with the VCI to destination host A2. The host transmits the ARP response back to A1 who places the MAC address in its connectionless cache and then forwards the MAC frame with this MAC address to the ATM MAC-emulation layer where it can be sent to destination host A2 using the procedures discussed above.

Alternatively, a centralized ARP server can be employed to translate connectionless addresses to MAC address for all the bridges and hosts in the network. Pre-configured Virtual Channel Connections ("VCCs") can be established from each host/bridge to this centralized server thus eliminating the need for any connection setup procedures to support the ARP message exchange. In some cases, there may be no access to higher layers that are embedded in an operating system. However, these higher layers may have support for an ARP server. The ARP server resides at a known MAC address so that bridges and ATM hosts can direct their requests and receive responses over a fixed connection. The ARP server is normally initialized by each host when it powers on or loaded by an administrator. The connection could be established at initialization time and held open or it can time-out and be reestablished as needed. The connection establishment follows usual LE-CRP procedures. An ARP request generated in the MAC layer is sent through this connection to the ARP server where it maps the network address to a MAC address. A connection from the ARP server back to the host can be established at initialization or as needed. The ARP reply is sent back to the requesting host where the returned MAC address is inserted into the frame that caused the initiation of the ARP request. LE-CRP procedures as described in previous subsections can now be used to send the original MAC frame. This time there is no multicast of the ARP request. If an Ethernet host needs ARP service, the bridge will act on behalf of the Ethernet host and will resolve the network address into a MAC address in the same fashion as for the ATM hosts except the bridge returns the result to the Ethernet host. In this case, the ARP connection should be established once at initialization to maintain rapid response.

Figure 11:
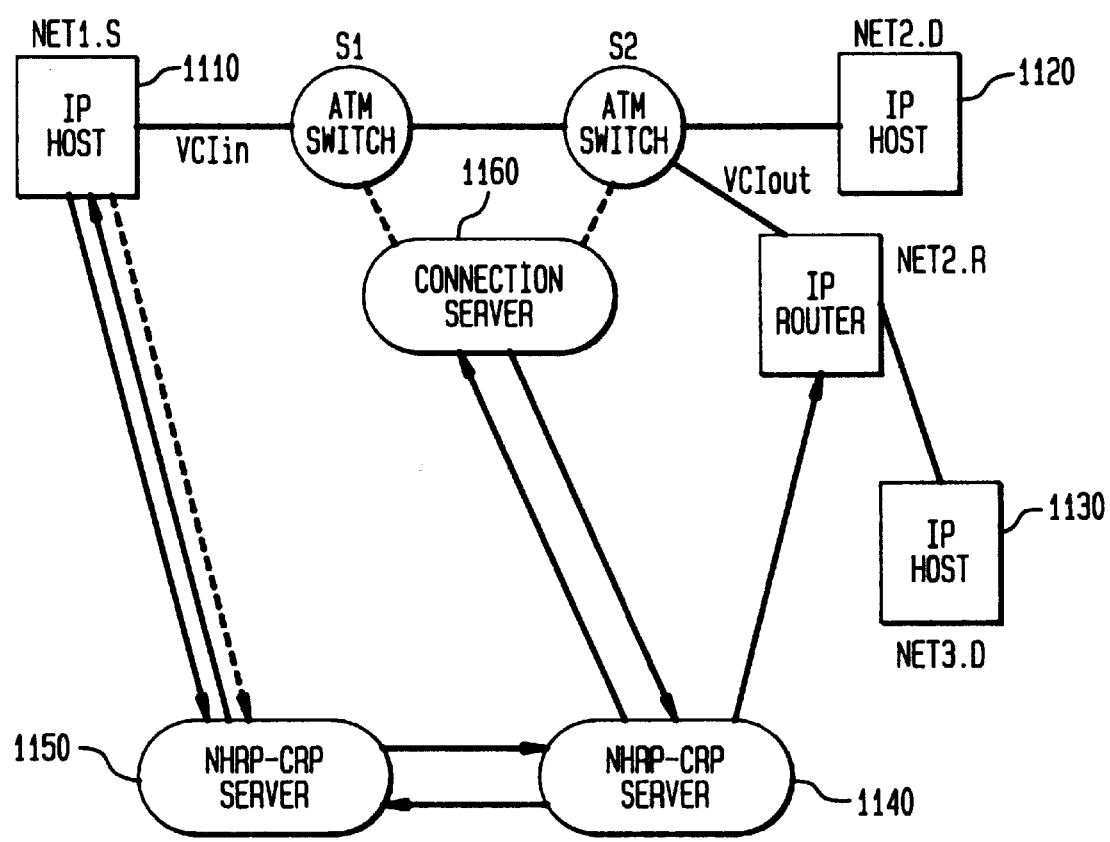
FIG. 11 illustrates the use of NHRP-CRP servers in accordance with the present invention.

CRP according to the present invention can be applied to cover end-points/networks operating according to the ROLC model as well. Referring to FIG. 11, the following is assumed. (i) Source 1110 (Net1.S) and possible destinations 1120 (Net2. D) and 1130 (Net3.D) do not share the same network prefix. (ii) CRP servers 1140 and 1150 are attached to the ATM network employ the NHRP protocol for address resolution, and are therefore referred to as NHRP-CRP servers. (iii) All nodes do not necessarily share the same NHRP-CRP server. (iv) Nodes attached to the ATM network use normal procedures when the destination node shares the same connectionless network prefix. (v) When the destination node does not share the same network prefix as the source node, the source node does not use its routing tables to identify the next-hop router. (vi) Each NHRP-CRP server 1140 and 1150, acquire the mapping from the connectionless address space to the ATM address space for all members of its own network. This is assumed to be accomplished by means of NHRP registration procedures over a well-known VCI.

When source node 1110 desires to send an IP packet to destination node 1120 or destination node 1130 it checks its local CRP cache for an existing IP to VCI mapping for the destination nodes 1120 or 1130. If it finds an entry, it simply sends the IP packet on the corresponding VCI. If not, it sends an NHRP-CRP request to its local NHRP-CRP server 1150 to resolve the target IP address to a local VCI. The protocol type field in the CRP request is set to ROLC. Upon receiving the request, NHRP-CRP server 1150 checks to see if the maximum NHRP-CRP server count is exceeded. If so, it returns an NHRP error. If the maximum count in not exceeded, the NHRP-CRP server checks local tables for the target IP address. If no entry is found in this server, it forwards the NHRP-CRP request to NHRP-CRP server 1140 in the direction of destination node 1120 or 1130 using regular IP procedures, for example, by routing the request along the path of the next-hop IP address for the destination node.

If NHRP-CRP server 1140 finds an entry for destination node 1120 or 1130 it invokes the local ATM Connection server 1160 with ATM addresses for destination node 1120 or 1130. ATM connection server 1160 communicates with channel servers at ATM switches 1170 and 1180 to set up the connection. Upon completion of a successful connection setup, the connection server 1160 responds with VCIin to source node 1110 and VCIout to destination node 1120 or 1130. NHRP-CRP server 1140 then returns a response to the original NHRP-CRP request it received from previous NHRP-CRP server 1150 with the selected VCI, VCIin, and the ATM address of the destination node 1120 or 1130. Local NHRP-CRP server 1150 then returns VCIin to source node 1110 to permit IP data transmission on the newly established ATM connection. Note that as in classical IP, NHRP-CRP for destination host notification of an incoming connection can be (i) based on hardwired VCIs, pre-registered for data reception; or (ii) message-based, where the network notifies the destination host of an incoming VCI.

If the returned VCI is to a connectionless router instead of a destination host on the ATM-based cloud, a VCI may already exist to that connectionless router if an ROLC procedure had been exercised earlier for another destination host behind the same router. To eliminate duplicate connections, the routers can return a netmask for all the connectionless addresses reachable behind the ATM router. The source node then uses this to detect other connectionless addresses behind the ATM router and directly forward their packets over an existing VCI to the router. Vendor specific fields in the NHRP protocol could be used to request connection service and return the VCI. Furthermore, ATM routers themselves can participate in the NHRP protocol where routing tables for ATM NHRP and for connectionless routing can be maintained.

Figure 12:
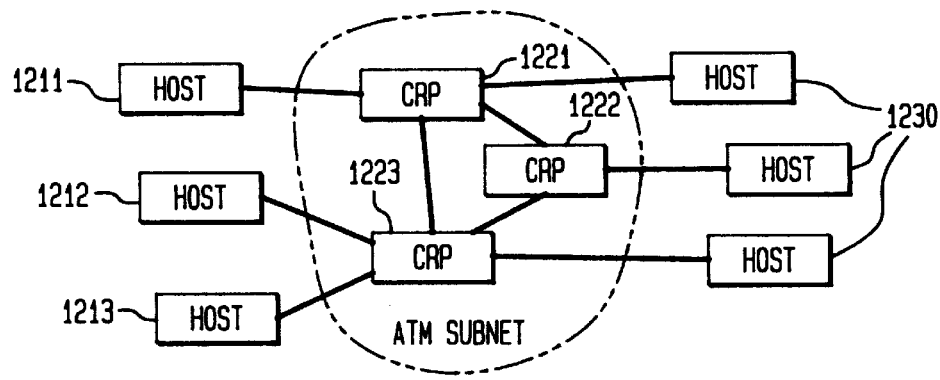
FIG. 12 illustrates the use of multiple CRPs in a Classical CRP network.
Figure 13:
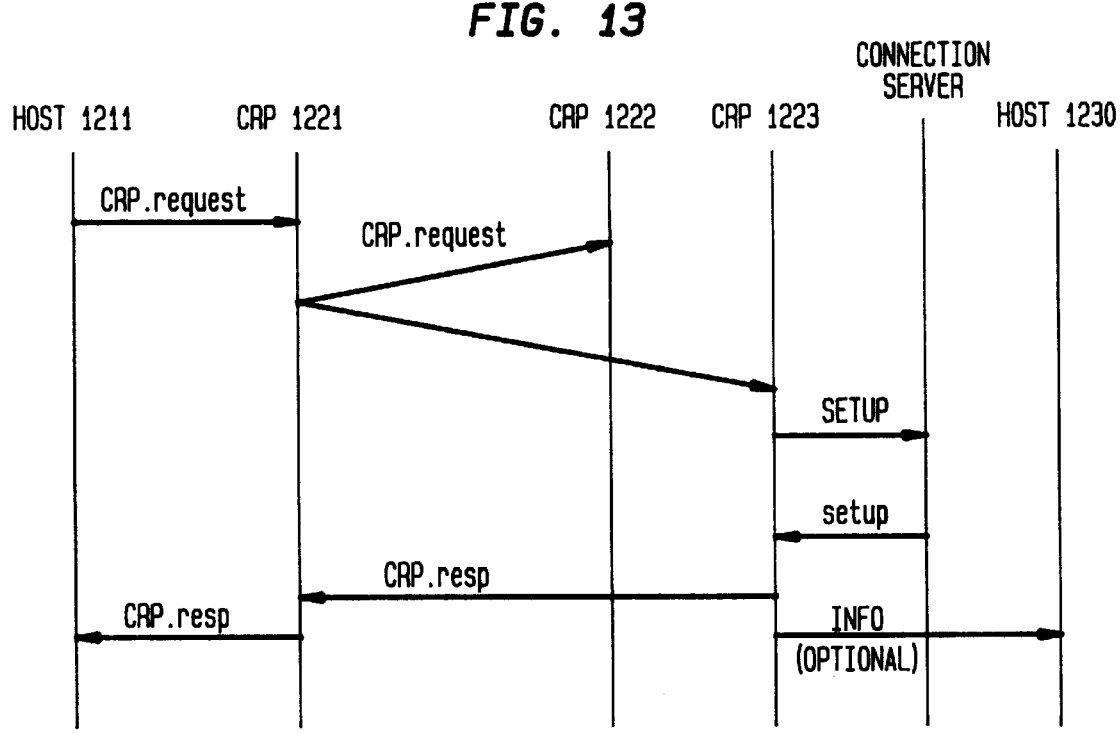
FIG. 13 illustrates the interaction of multiple CRPs in a Classical network for managing the connection between source and destination hosts.

In the classical connectionless over ATM network, all connectionless addresses on one sub-network have the same connectionless sub-network address. For class A and B networks, there could be large numbers of hosts attached to the network. For CRP, this could lead to scalability problems with the CRP server becoming a bottleneck especially if the CRP server and the connection server share the same process or processor. Referring to FIG. 12 several CRP servers 1221, 1222, 1223 in a Classical CRP network are shown. Each host 1211, 1212, 1213 is associated with a CRP server. If for example, CRP server 1221 cannot resolve an address, it broadcasts the request to CRP servers 1222 and 1223 which will then request the connection on behalf of host 1211 and return the VCI back to the requester via CRP server 1221, as shown in FIG. 13.

Figure 14:
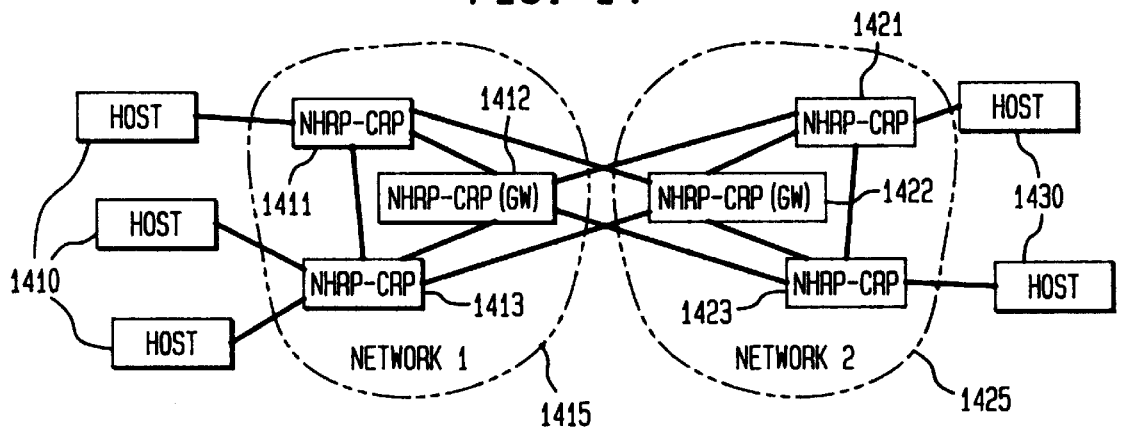
FIG. 14 illustrates an ROLC network with multiple NHRP-CRP servers on two networks connected by NHRP-CRP gateways.

Similar to the Classical case, an NHRP-CRP server could also become a bottleneck. To allow for scalability, multiple NHRP-CRP servers in each network are allowed as shown in FIG. 14 for a two network example. Each network 1415 and 1425 have several NHRP-CRP servers 1411–1413, and 1421–1423, respectively. When an NHRP-CRP server receives a request that it cannot resolve that is in its own network, it broadcasts the request to the other servers in the network as in the Classical-CRP case above. One of the servers responds with the VCI.

Figure 15:
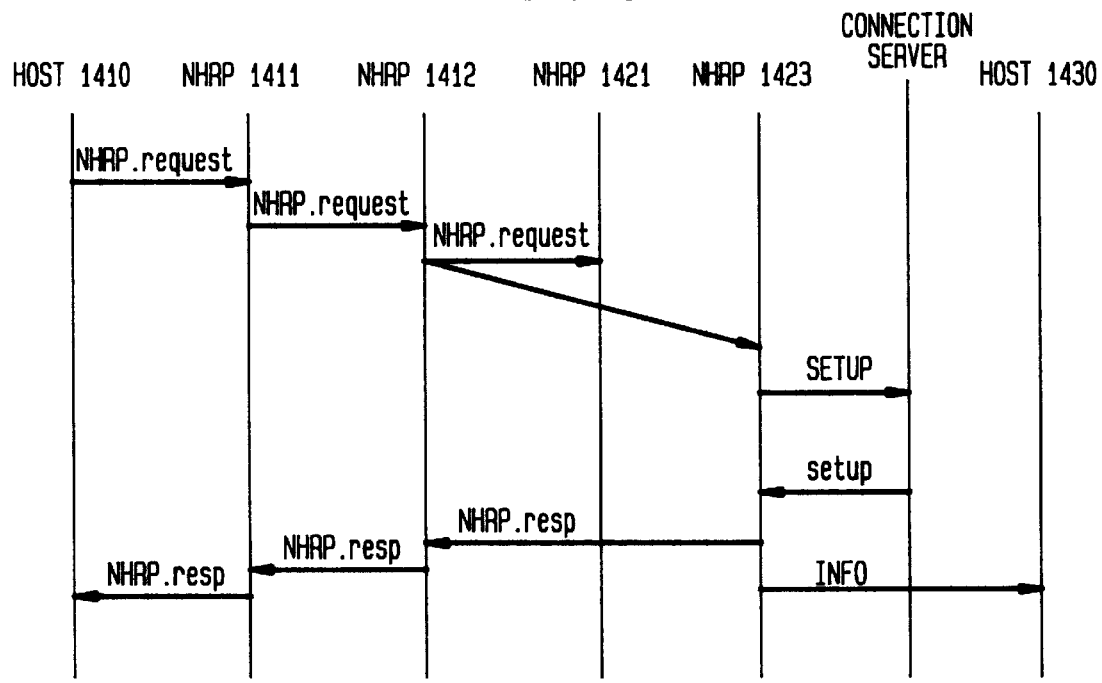
FIG. 15 illustrates the interaction of multiple NHRP-CRPs in an ROLC network for managing the connection between source and destination hosts.

When an NHRP-CRP server cannot resolve an address because it is in a different network, there are two options. First, each server knows the address of a gateway NHRP-CRP server 1412 and 1422 in the network of the next hop along the route. When an NHRP-CRP server receives an NHRP request for an address that is not in its own network, it forwards the request to the gateway NHRP-CRP server in the network of the next hop. Alternatively, the request could have been forwarded through the local gateway to the NHRP-CRP server in the next hop, thereby reducing the number of internetworking connections between the two networks. However, this would require one extra hop for the message. When the proper NHRP-CRP server in the destination network is reached, that server will process this request, and return a VCI to the source. The flow for processing an NHRP request is shown in FIG. 15. In this example, the source host on Network 1, Host(Net1.source), sends an NHRP request to its NHRP-CRP server. The request asks that the next hop for a destination host on Network 2 (Host(Net2.destination) be found. NHRP-CRNet1.S determines that the request must be forwarded to the gateway NHRP-CRP server in network 2, NHRP-CRNet2.GW. The gateway NHRP-CRP server in network 2 determines that it cannot fulfill this request, and broadcasts the request to all other NHRP-CRP servers in its network. The NHRP-CRP server that serves Host(Net2.destination), NHRP-CRNet.2.D, resolves the next hop, and communicates with the connection server to establish a connection between Host(Net1.source) and Host(Net2.destination).

Once the connection is established, NHRP-CRNet2.D informs Host(Net2.destination) that it has an active incoming connection (INFO), and returns the resolved address to the source NHRP-CRP server, NHRP-CRNet1.S via the gateway NHRP-CRP server.

The connection information is then returned to the source host, Host (Net1.source), by its NHRP server NHRP-CRNet1.S. The NHRP-CRP server that requests the connection from the connection server is ultimately responsible for releasing the connection. In this example, if NHRP-CRNet1.S determines that the connection between Host (Net1.source) and Host(Net2.destination) should be released, it contacts NHRP-CRNet2.D via the gateway NHRP-CRP server and requests that the connection be released. NHRP-CRNet1.S knows that NHRP-CRNet2.D is responsible for the connection because of information received in the response to the original NHRP request.

When hosts are brought on-line, they each register with their local NHRP-CRP server. This information is not propagated through the network, but stored locally. Local storage is sufficient because within a network, NHRP requests are broadcast to all NHRP-CRP servers if the request cannot be resolved locally. This scheme eliminates problems of database synchronization among the NHRP-CRP servers. Notice that within a network, all NHRP-CRP servers are able to communicate with each other, thus allowing the broadcast mechanism to work.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method of communicating connectionless datagrams between a source node and a destination node over a connection-oriented network, said method comprising the steps of:

transmitting from said source node to a connection request server coupled to said connection-oriented network a connectionless address of said destination node to signal a request to communicate with said destination node;

in response to said request received by said connection request server, establishing from said connection request server a connection-oriented virtual channel between said source node and said destination node using third-party control;

assigning a virtual channel identifier to said connection oriented virtual channel;

transmitting said virtual channel identifier from said connection request server to said source node;

segmenting said connectionless datagrams into one or more appropriate size connection-oriented cells, each of said cells including said virtual channel identifier; and transmitting said one or more cells from said source node to said destination node on said connection-oriented virtual channel.

2. A communications system for communicating connectionless datagrams over a connection-oriented network, said system comprising:

a source node;

a destination node;

at least one connection request protocol server for receiving a request from said source node to resolve a connectionless address of said destination node into a connection-oriented address of said destination node and for establishing a connection-oriented virtual channel between said source node and said destination node for communicating said connectionless datagrams using a third party connection protocol;

at least one connection server connected to said at least one connection request protocol server for determining an end-to-end route between said source node and said destination node; and one or more channel servers, each of said channel servers connected to one or more of said connection servers on one end and a respective connection-oriented switch on another end, each of said channel servers for determining if said respective switch can maintain a required bandwidth on said connection oriented virtual channel.

3. A communications system for communicating connectionless datagrams over a connection-oriented network, said system comprising:

a source node;

a destination node;

a plurality of connection request protocol servers for receiving a request from said source node to resolve a connectionless address of said destination node into a connection-oriented address of said destination node and for establishing a connection-oriented virtual channel between said source node and said destination node for communicating said connectionless datagrams using a third party connection protocol, wherein said source node transmits said request to a first one of said plurality of connection request protocol servers; and means for broadcasting said request from said first one of said plurality of connection request protocol servers to other connection request protocol servers of said plurality of connection request protocol servers if said first one of said plurality of connection request protocol servers cannot resolve said request.

* * * * *